(12) United States Patent
Ghio

(10) Patent No.: US 11,104,436 B2
(45) Date of Patent: Aug. 31, 2021

(54) METHODS AND APPARATUS FOR THE EMPLOYMENT OF DRONES IN FIREFIGHTING ACTIVITIES

(71) Applicant: Inspire S.r.l., Genoa (IT)

(72) Inventor: Marco Ghio, Genoa (IT)

(*) Notice: Subject to any disclaimer, the term of this patent is extended or adjusted under 35 U.S.C. 154(b) by 308 days.

(21) Appl. No.: 16/304,685

(22) PCT Filed: May 26, 2017

(86) PCT No.: PCT/IT2017/000106
§ 371 (c)(1),
(2) Date: Nov. 26, 2018

(87) PCT Pub. No.: WO2017/208272
PCT Pub. Date: Dec. 7, 2017

(65) Prior Publication Data
US 2020/0324895 A1    Oct. 15, 2020

(30) Foreign Application Priority Data
May 31, 2016   (IT) .................. 102016000056273

(51) Int. Cl.
*B64C 39/02* (2006.01)
*A62C 3/02* (2006.01)
*B64D 1/16* (2006.01)
*B64F 1/00* (2006.01)
*G05D 1/10* (2006.01)

(52) U.S. Cl.
CPC .......... *B64C 39/024* (2013.01); *A62C 3/0242* (2013.01); *B64D 1/16* (2013.01); *B64F 1/00* (2013.01); *G05D 1/104* (2013.01); *B64C 2201/042* (2013.01); *B64C 2201/12* (2013.01);
(Continued)

(58) Field of Classification Search
USPC ............................................................ 701/3
See application file for complete search history.

(56) References Cited

U.S. PATENT DOCUMENTS 10,315,528 B1 *  6/2019  Crawford, Jr. .......... B60L 53/30
10,777,051 B1 *  9/2020  Kumar .................... G08B 7/066
(Continued)

FOREIGN PATENT DOCUMENTS

GB       2530626       3/2016
KR      101566341     11/2015
(Continued)

*Primary Examiner* — Tyler D Paige
(74) *Attorney, Agent, or Firm* — Themis Law

(57) ABSTRACT

A coordinated support system for drones includes support units that have the shape and size of a common container and can be easily moved by using common road tractors, so to position a drone fleet close to a fire, possibly recover the aircraft at the end of the mission, and enable transfer during the mission to areas of strategic interest or priority importance to effectively fight the spreading of fire fronts in real time. Coordination and control are carried out through a control unit. The drones are powered by batteries, the automated replacement and recharging of which extends flight autonomy. The system enables an initial filling and subsequent multiple refills of the drones with an extinguishing liquid contained in small dispersible containers, which can be hooked and unhooked from the drones by remote control so to perform multiple missions.

7 Claims, 4 Drawing Sheets

(52) U.S. Cl.
CPC .... *B64C 2201/146* (2013.01); *B64C 2201/18* (2013.01); *B64C 2201/208* (2013.01)

(56) References Cited

U.S. PATENT DOCUMENTS

| | | | | |
|---|---|---|---|---|
| 2013/0123981 A1* | 5/2013 | Lee | ............... | H04W 4/029 |
| | | | | 700/248 |
| 2015/0120126 A1* | 4/2015 | So | ............... | G01C 23/00 |
| | | | | 701/26 |
| 2015/0148988 A1* | 5/2015 | Fleck | ............... | B64D 1/14 |
| | | | | 701/2 |
| 2016/0144734 A1* | 5/2016 | Wang | ............... | B60L 53/126 |
| | | | | 701/17 |
| 2016/0364989 A1* | 12/2016 | Speasl | ............... | G08G 5/0069 |
| 2017/0137124 A1* | 5/2017 | Walker | ............... | G08B 25/10 |
| 2017/0225802 A1* | 8/2017 | Lussier | ............... | E04H 12/003 |
| 2018/0169866 A1* | 6/2018 | Wise | ............... | G05D 1/104 |
| 2018/0184637 A1* | 7/2018 | Erickson | ............... | B64C 39/024 |
| 2020/0140087 A1* | 5/2020 | Fulbright | ............... | B60L 53/80 |
| 2020/0324895 A1* | 10/2020 | Ghio | ............... | A62C 3/0242 |

FOREIGN PATENT DOCUMENTS

| | | |
|---|---|---|
| WO | 2014080385 | 5/2014 |
| WO | 2016205415 | 12/2016 |

\* cited by examiner

METHODS AND APPARATUS FOR THE EMPLOYMENT OF DRONES IN FIREFIGHTING ACTIVITIES

TECHNICAL FIELD

The object of the present invention is a method and apparatus for the employment of drones in firefighting activities.

BACKGROUND ART

In the past decades, the issue concerning fighting fires, in particular forest fires, has become more and more important because of the increase in the frequency, incidence and magnitude of these phenomena and their dangerous consequences involving people, things and natural environment.

Forest fires fighting is carried out through a variety of air/ground interventions and thanks to the coordination of various actors, such as the fire brigade, civil protection, police forces and volunteers.

Ground interventions usually involve indirect actions, such as targeted deforestation in certain areas in order to eliminate potential combustible for fires (vegetation) and also the so-called burning out actions aimed at strategically limiting and deviating the spreading of flames. There are also the so-called direct actions involving the use of hydrants and similar means in order to spread water and/or extinguishing liquids onto the fire front, e.g. ammonium phosphate-based mixtures. Air interventions, which are the object of the present invention, include the use of large aircraft, such as helicopters, planes or other aircraft equipped with containers for picking up water from special reserves and dropping it both on the fire front and on the central part of the fire to counteract its development.

The above-mentioned technique has several drawbacks. Ground interventions, for example, are little effective because of their limited effect on large fires. Another problem is the high cost of aerial firefighting due to the purchase, the use and the maintenance of the aircrafts and of the training of staff. This is the reason why, today it is still noticeable that said aircraft fleets (e.g. the known aircraft, generally known as Canadair) are much fewer than what it would be really needed and cannot meet the demands for firefighting interventions, both in terms of rapidity and geographical coverage of the national territory. Finally, it should be reminded that, for safety reasons, aerial firefighting can only be carried out during the day and that, due to the need to pick up water after each intervention and to refuel on a regular basis, the firefighting aircraft are able to perform only a limited number of water drops, and even more importantly, such water drops can be done and are really useful only if there is at least one nearby dedicated place to pick up water from (lake, calm sea, basin, etc.) that is able to easily and quickly provide the extinguishing liquid (water drops must be very frequent to be effective).

Another problem is that the currently performed interventions do not guarantee an optimal water spraying. During ground interventions, the distance at which the extinguishing liquid is dropped is limited and does not reach the heart of the fire, whereas during aerial interventions the water drop is instantaneous and precisely located, thus covering a relatively small surface, which reduces its effects.

Considered the above-mentioned problems and with particular reference to aerial solutions, what has been noticed over the past few years is the ever increasing use of drones and, in general, of the so-called Unmanned Aerial Vehicle (UAV) for firefighting purposes. The use of drones has partially solved some of the above mentioned critical issues and, in particular, the fire monitoring and, in particular, its temporal and spatial developments. This led to significant consequences on the management of the problem, the coordination of ground initiatives, as well as on the safety of employed staff and of people and properties close to the affected areas. Up to now, however, it is observed that the use of drones in firefighting applications, useful for the above-mentioned reasons and despite their increasing fame because of their commercial deployment, is fundamentally limited to the field of control, analysis, logistical support and, more generally, supervision, whereas there is no evidence of direct use of said devices to actively fight fires: in particular for the drop of water or extinguishing liquids. This is true in spite of the fact that the state of the art envisages many solutions, and in particular patents, suggesting the use of small aircraft for the strategic drop of small quantities of water.

Such solutions are all based on the same idea, the so-called rain effect, i.e. dropping small quantities of firefighting liquid or drizzling it over the fire, and its subsequent spreading on a large area instead of in a concentrated manner. This method, both theoretically and experimentally, is acknowledged as being particularly effective, whereas, on a practical level, it is effectively used in domestic and/or industrial firefighting systems.

The use of the rain effect on large-scale fires has been assumed for a long time (FR2624750A1-KAIDONIS ARISTIDE[FR], 23 Jun. 1989).

This patent was then followed by a number of derivative patents constituted by implementation variants of said rainfall effect, among which, for example, water drops from aircraft (EP2163279A1—LONESTARS INVENTIONS [US], 17 Mar. 2010), water drops from helicopters or drones (DE20315789U1-BETKE FRIEDRICH[DE], Oct. 10, 2003), water drops from aerostats or similar aircraft directed at the fire by using predictive methods (IT00001411012—MARCO GHIO, 12 Apr. 2012).

These solutions, though ingenious, have not been applied to a real and effective use in firefighting interventions by the authorities and the bodies in charge because of a number of problems, including the limited number of missions that can be carried out and hence the limited amount of liquid that can be dropped on to the flames; the impossibility, in some cases, of recovering the extinguishing liquid containers (which causes pollution) or the means used (e.g. the aerostats). Moreover, it must be considered the high cost of the assumed aircraft or of helium (in the case of aerostats), the difficulty of controlling drone fleets in such complex environments, the limited autonomy of drones that, being equipped with batteries, only allow short missions. To these issues, it is necessary to consider the above-mentioned problems related to the traditional methods, and not yet solved (pick up of water or liquid, impossibility of operating beyond given distances, etc.).

DISCLOSURE OF THE INVENTION

Drones have reached a technological maturity and very affordable costs, but their direct use in direct firefighting applications is still largely limited by the aforementioned problems.

This patent aims to realize a system which is able to overcome said issues, and in particular the limited autonomy due to the presence of batteries on board the drones, the limited capacity of dropping the extinguishing liquid due to the inherent load limits of these devices, the difficulties related to their transport to the burning areas and their subsequent recovery at the end of the intervention. Moreover, the aim is to strategically position them with respect to the fire, its development and any areas of priority interest, as well as the efficient use of the smallest possible number of said means and their intelligent coordination during missions, even by night use, contrary to the generally used aircraft operated by pilots.

This goal is achieved by creating a coordinated system of control and support units for drones, in order to carry out missions for the drop of small quantities of firefighting liquid (i.e. based on the rain system). Said support units have the shape and size of a common container and can be easily moved by using common road tractors or equivalent vehicles. This allows not only the positioning of a drone fleet close to the fire and the possible recovery of the aircraft at the end of the mission, but also any transfer during the mission to areas of strategic interest or priority importance to effectively fight the spreading of the fire fronts in real time. In addition to the transfer of the employed units, the proposed system also allows the automated replacement and recharging of the batteries the drones are equipped with, in order to extend their flight autonomy. Finally, the system allows for the initial filling and subsequent multiple refills of drones with the appropriate firefighting liquid contained in small, replaceable and dispersible containers, that can be hooked and unhooked from drones by remote control to allow them to perform multiple missions. Finally, the system according to the present invention includes a control unit (that might also be transferred and housed within a container unit) for the coordination of missions, the flight paths to be followed, the selection of the ideal drop points optimized according to the environmental conditions and the interventions scenario, the coordination of the refilling interventions and the ideal management of the available units, as well as the selection and, if necessary, dynamic remodelling of the areas where to position and, if necessary move to, the support and refilling containers of the drones and the interventions areas according to the variant-time priorities.

BRIEF DESCRIPTION OF THE DRAWINGS

Further characteristics and advantages of the proposed technical solution will appear more evident in the following description of a preferred but not exclusive embodiment shown by way of example and not of limitation in the accompanying no. 4 drawings, in which.

BEST MODE FOR CARRYING OUT THE INVENTION

Figure 1:
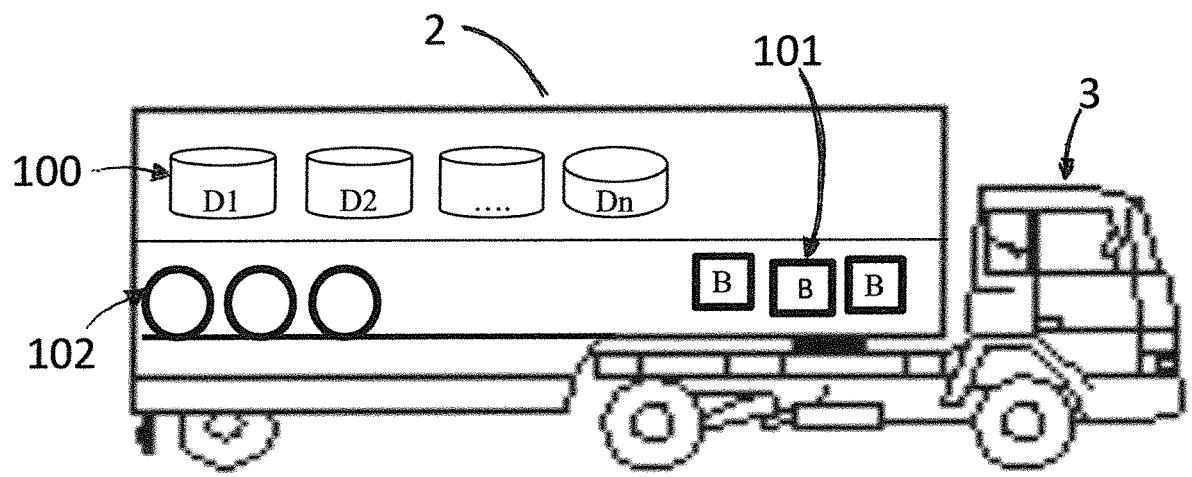
FIG. 1 indicates the system control unit which, by means of radio signals, controls and monitors the positions of the drone support units in the form of containers (e.g. intermodal containers) and loaded on road tractors. Said unit communicates, monitors and controls the action of drones.
Figure 1:
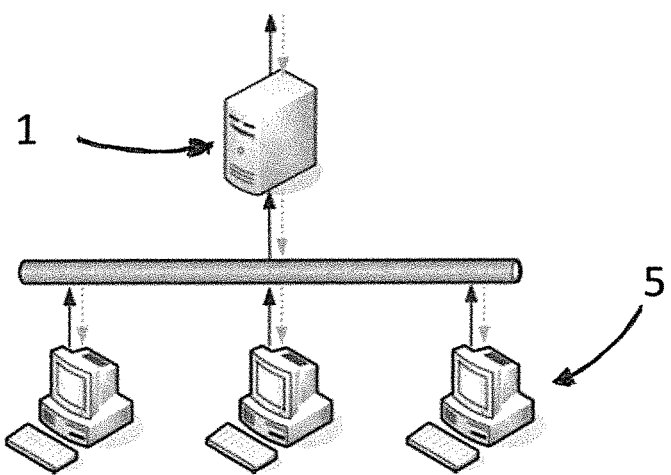

With reference to the accompanying drawings and in particular to FIG. 1 thereof, the components of the control communication system are schematically identified, comprising a controller (1) suitable to manage and plan the use of a drone (100) fleet that in their rest condition are housed together with back-up batteries (101) and containers containing firefighting liquid (102) within one or more containers (2) of a size and shape suitable for easy handling by, for example, a standard road tractor (3). Said containers can then be positioned nearby and depending on the burning area and might be possibly moved according to the spreading of the fire, as it will be better described below. Preferably, but not necessarily, the controller (1) is a computer that is physically separated from the drones (100) and connected to them by means of a wireless connection (4).

Drones (100), housed inside the container (2), are possibly characterized by the presence of dual feeding, i.e. at least two power supply batteries, one of which is used as a backup battery, and one is used to supply power to engines, navigation systems, on board sensors and equipment, such as the equipment dedicated to communication and remote control. Drones (100) are also equipped with a hooking system allowing them to load and carry containers containing extinguishing liquid (102). One or possibly more containers (2) containing said drone (100) fleet are positioned by the road tractors (3) nearby the burning areas at the ideal locations identified and selected by the controller (1) following a preliminary analysis of orographic characteristics, vehicular accessibility, environmental parameters such as wind, temperature, humidity and relevant information from the context, and taking into account strategic factors such as the presence of priority targets to be protected and/or data related to the recent spreading of the fire.

The wireless connection system (4) is designed to allow a bidirectional transfer of data between drones (100), controller (1), and any firefighters in the area, thus allowing the creation of a collaborative system made of a swarm of drones, which are able of self-management by using specific algorithms and the exchange of information, such as telemetry, position, movement, information coming from on board sensors, environmental data and, of course, command, control, navigation and coordination signals from the fire fighting forces, means and aircraft.

The controller (1) is in turn housed in a movable physical unit, which is functionally similar to the container (2) and is therefore also potentially movable by means of road tractors (3), or equivalent vehicles, to be transferred close to the area affected by the fire, and further transferred according to the spreading of the fire. The controller (1) is also equipped with connection devices to geographical networks in order to be safely controlled, if needed, from remote stations (5) in order to keep the operators safe, and they will be able both to work next to the containers (2) and use remote control applications, i.e. at a safe distance from the means and the fire front. The same safety considerations apply to firefighting operators in charge of driving road tractors (3), who may, after positioning the containers (2), drive away from the burning areas.

Figure 2:
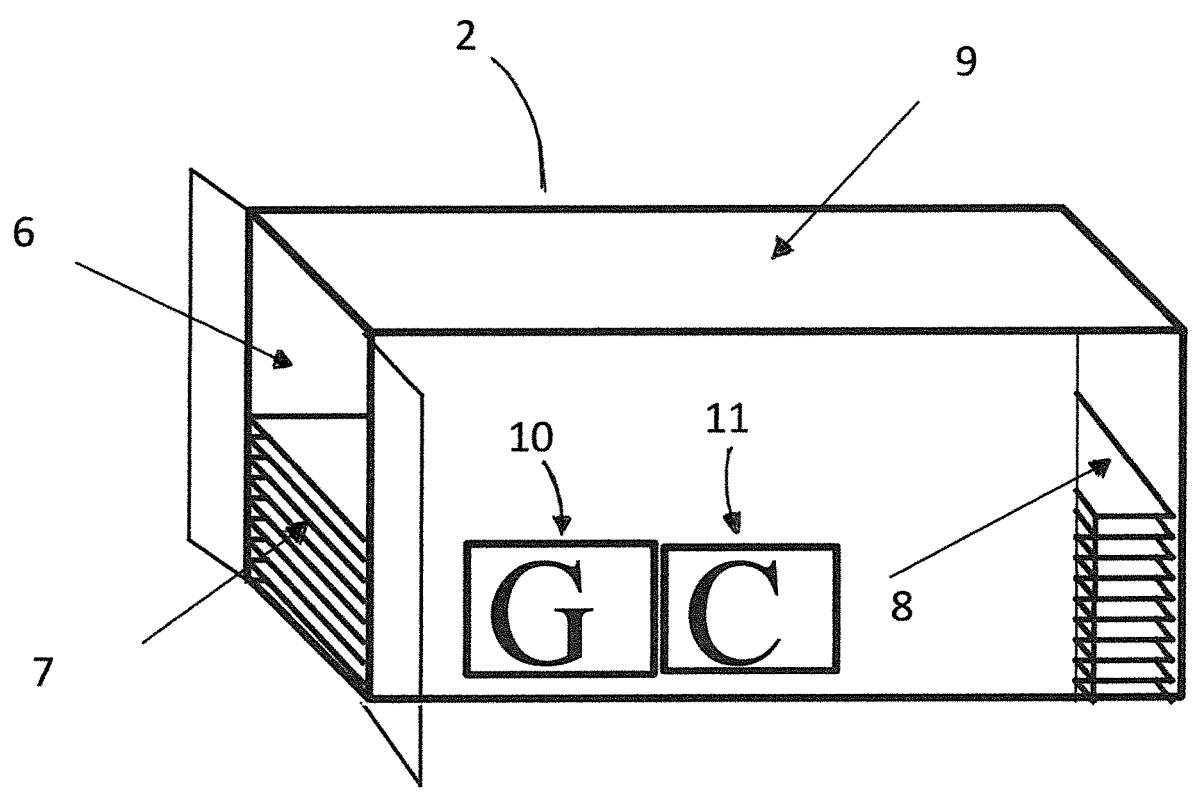
FIG. 2 shows the general structure of a drone support unit for storing and refilling and its internal subdivision into functional areas.

With reference to the accompanying drawings, and in particular to FIG. 2 thereof, those parts of the container units that are functionally significant, are schematically identified and they are dedicated to support the firefighting missions of the drones and, in particular, to their transfer, to the storage, replacement and charge of the batteries, and, eventually, to the storage and replacement of the containers containing the firefighting liquid. In particular, a support container (2) comprises a space (6) for accommodating the drones for them to be transported, a storage area (7) of suitable containers containing firefighting liquid and a storage area (8) for storing and recharging the batteries (101) of the drones.

The container (2) is also equipped with an electric generator/charger (10) and a fuel tank (11) or equivalent functional devices, said devices being remotely controllable and designed to guarantee the energy independence and the autonomy of the container, and above all the charge of batteries (101) regardless of the presence of a road tractor (3).

Finally, the container (2) includes a number of automatic mechanisms that can be remotely controlled by the controller (1), which allow the automatic launch/retrieval of the drones in the take-off/landing area (9) and the ejection at predetermined positions of the containers containing the firefighting liquid stored in the area (7) and the batteries housed in the area (8). The landing, replacing and taking-off area of the container (9) is then equipped with automated exchange and hook systems that allow the employed drones to land, unload the empty batteries, if necessary, for them to be recharged and automatically load new batteries and a container containing an extinguishing liquid for their next missions.

Figure 3:
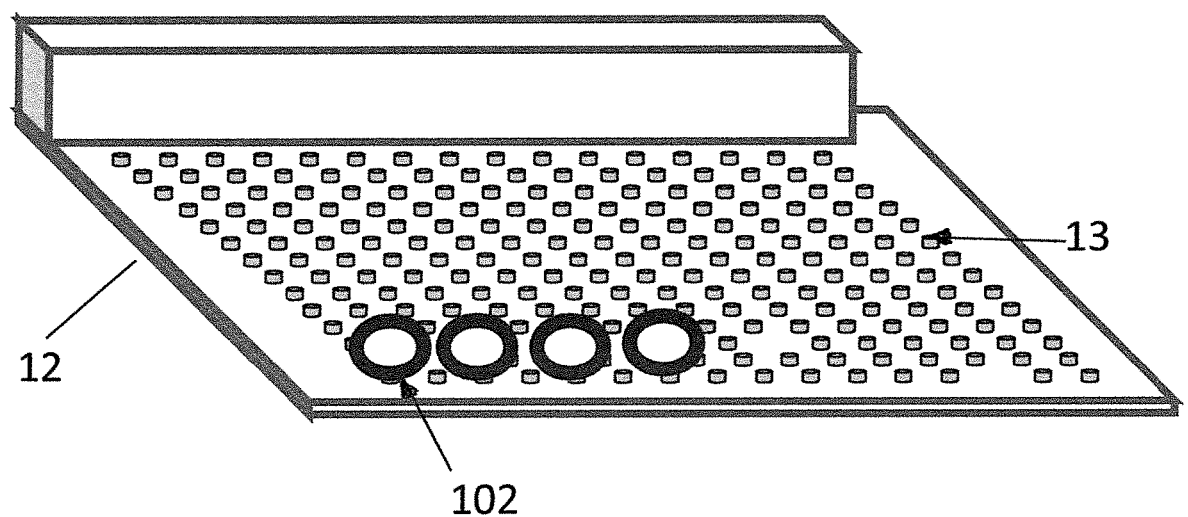
FIG. 3 shows the specification of the storage system for containers containing the fire extinguishing liquid.

With reference to the accompanying drawings and in particular to FIG. 3 of the drawings, the shelves (12) inside the container (2) are schematically identified and positioned in space (7) and designed to accommodate the containers containing firefighting extinguishing liquid (102), said containers being anchored to a series of connectors (13) which secure them and keep them in a fixed and predetermined position and facilitate their loading, thanks to an automated system, onto the equipped area (9) allowing drones to land, be reloaded and take off. It should also be noted that said connectors (13) will be equipped with occupancy sensors to allow the automated control of the stocks of firefighting containers (102).

Figure 4:
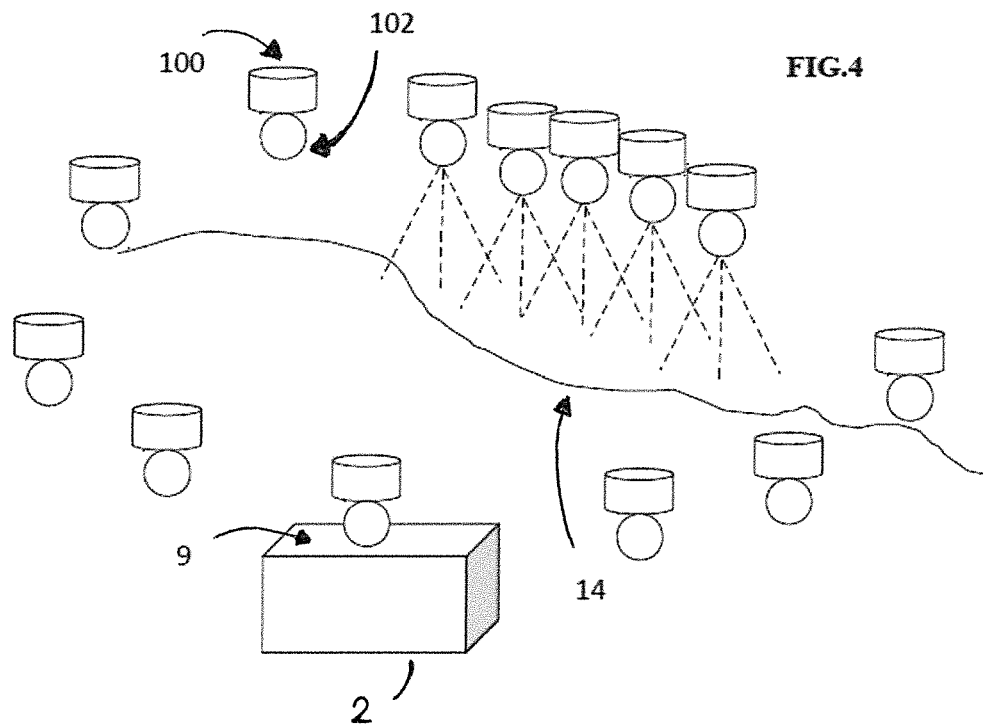
FIG. 4 shows a lateral perspective view of the dynamics of a drone fleet and the subsequent steps of landing, refilling on the support container, take-off and subsequent drop of extinguishing liquids containers onto the burning area.
Figure 5:
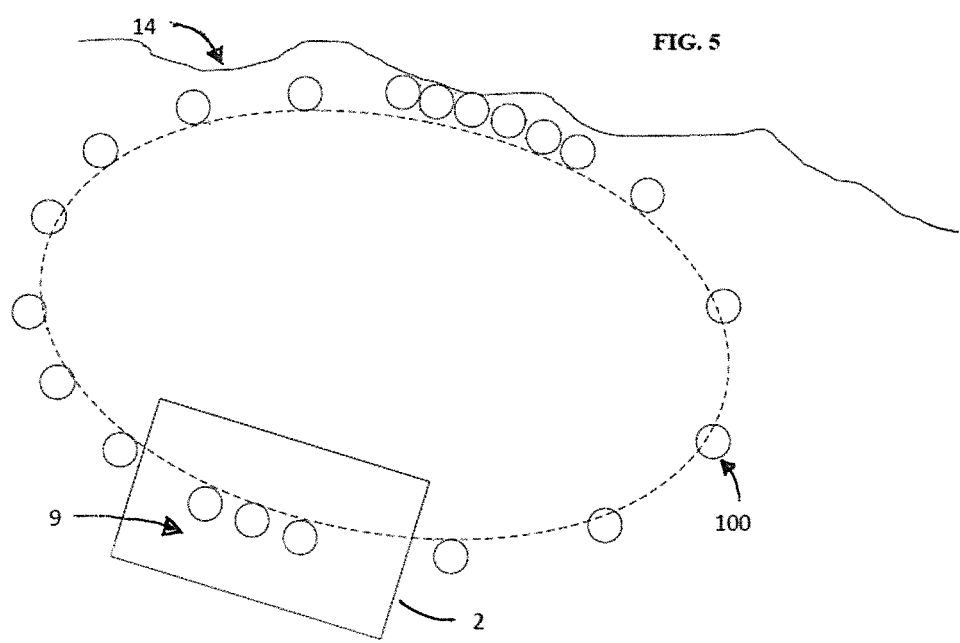
FIG. 5 shows the same dynamics as in FIG. 4, illustrated in top view.

With reference to the accompanying drawings, and in particular FIGS. 4 and 5 thereof, the container (2) is schematically identified, safely positioned in functionally strategic areas and close to the fire front (14), said areas being anyway compatible with the orographic situation of the territory, the availability of vehicular accessibility around the area of intervention and the presence of very important targets that need to be protected, all of this is based on strategic analyses and processing carried out by the control unit (1) based on a specific intervention management algorithm. FIGS. 4 and 5 show drones (100) which follow a cyclic path and land on the equipped and automated exchange area, on the landing and take-off area (9) for the necessary reloading, recharging/replacing interventions of the firefighting liquid containers and, if necessary, of the batteries. Said equipped area (9) is equipped with automated control, management and automatic routing mechanisms to facilitate the landing of the drones, the hooking to a restraining and translation mechanism which, while the drones slide along that same area (9), unhooks the empty container and hook to the drone a new container filled with firefighting liquid (102), which will be used during the next. If the battery used by the drone is almost empty, it is disconnected from the drone and replaced with a new charged battery (101) taken from those available in the dedicated area (8) and made available on the surface of the equipped area (9) by using an automatic lifting and ejection system. At the same time, the system allows the empty battery to be moved to the lower level of the container (2), and in the area (8) designed for storage and especially for recharging the empty batteries.

The drone, refilled with the firefighting liquid, and possibly reloaded with a new charged battery that is needed to fly, can then take off again and fly towards the concerned area and drop the extinguishing liquid contained in the new firefighting liquid container (102) on the concerned area (14) according to information related to target, trajectory, and coordination with other aircraft provided by the control unit (1) and the by mutual cooperation and communication between them. In such a way, the explained procedure can be cyclically repeated in a virtually infinite manner, in order to contribute to the continuous control and containment of the fire.

INDUSTRIAL APPLICABILITY

The invention can be realized with technical equivalents other than the currently envisaged drones and systems, by using supplementary materials or devices fit for the purpose. By way of example and not of limitation, it is noted that the geometric shapes of the elements may be varied while maintaining the functionality. The containers (2) for the drone support may for example be integrated by further additional containers that only contain refills for containers and/or batteries to supply power to the drones. At the same time, the current base housing the drones (12) could be equipped with nozzles for refilling containers to develop a system that recycles the used containers instead of scattering or storing them as empty containers in their respective containers. Lastly, it could be developed a system where containers are filled only when actually used and containers are positioned next to dedicated tank containers where large quantities of extinguishing liquid are kept. Finally, it should be noted that the proposed solution can be modified with known changes to allow for the use of drones for missions and technological environments that are completely different from the primarily assumed firefighting scenario. By way of example, and not of limitation, potential uses are mentioned, such as the dispersion or spread of different materials, either solid, liquid materials or powders, for industrial or agricultural purposes (fertilization, disinfestation, irrigation and similar processes).

Last but not least, depending on the size of the fleet, on the employed means and on the material to be transported, an expandable area (9) equipped for landing, taking-off and refilling might be needed or, depending on the specificities of the intervention, the area might be different and separated from the container unit (2).

The invention claimed is:

1. Coordination, control and logistics support system for fleets of drones in firefighting missions aimed at launching small amount of an extinguishing fluid, comprising:
   a) a fleet of drones (100) equipped with a coupling and ejection system of containers of the extinguishing fluid (102);
   b) at least one logistics support unit shaped as a container (2) adapted to house the drones (100), drone batteries (101) and the containers of the extinguishing fluid (102), said at least one logistics support unit being transportable with road tractors (103);
   c) a control unit (1), transportable with the road tractors (103) which communicates via radio signals, (4) and controls, coordinates and monitors all constituent parts of the coordination, control and logistics support system and operators on the ground, the control unit enabling communication towards remote users (5); and
   d) an equipped area (9) for landing and take-off of the drones (100), for automated replacement of the drone batteries (101), and for an automated loading of containers of the extinguishing fluid (102);

wherein said at least one logistics support unit shaped as a container comprises:

e) an automatic ejection system of the drones (100) from an inner space dedicated to the drones (6) towards the equipped area (9);

f) an automatic ejection and collection system for the batteries (101) operating between an inner space of storage and recharge (8) and the equipped area (9);

g) an automatic ejection system of the containers of the extinguishing fluid (102) from the inner space of storage (7) towards the equipped area (9);

h) an electric generator/battery charger (10) to allow recharging of exhausted drone batteries (100); and i) a fuel tank (11) or a primary energy storage system adapted for the operation of the equipped area (9).

2. The coordination, control and logistics support system according to claim 1, wherein said inner space (7) of storage has a series of connectors (13), which allow coupling and holding in fixed positions the containers of the extinguishing fluid (102).

3. The coordination, control and logistics support system according to claim 2, wherein said connectors (13) are provided with presence sensors to allow controlling stocks of the containers of the extinguishing fluid (102).

4. The coordination, control and logistics support system according to claim 1, wherein said control unit (1) is provided with geographical network connection equipment and is configured to be driven from remote locations (5).

5. The coordination, control and logistics support system according to claim 1, wherein said equipped area for landing and take-off (9) is realized at an upper part of the container (2) and provided with expansion mechanisms to facilitate the landing and take-off of the drones.

6. The coordination, control and logistics support system according to claim 1, wherein said equipped area for landing and take-off (9) is positioned in an area distinct and contiguous to the container (2).

7. The coordination, control and logistics support system according to claim 1, wherein said fleet of drones (100) is equipped with coupling and ejection systems, which allow transport of different materials other than the containers of the extinguishing fluid (102).

\* \* \* \* \*